(12) United States Patent
Seth et al.

(10) Patent No.: US 7,243,346 B1
(45) Date of Patent: Jul. 10, 2007

(54) CUSTOMIZED LIBRARY MANAGEMENT SYSTEM

(75) Inventors: Demsey M. Seth, Redmond, WA (US); Ray Patch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 09/862,412

(22) Filed: May 21, 2001

(51) Int. Cl.
*G06F 9/445* (2006.01)

(52) U.S. Cl. ............... 717/163; 717/162; 717/165; 717/166; 717/170

(58) Field of Classification Search ........... 719/331, 719/332; 717/106–108, 120–122, 169–178, 717/162–170
See application file for complete search history.

(56) References Cited

U.S. PATENT DOCUMENTS

| | | | |
|---|---|---|---|
| 5,212,790 A | 5/1993 | Ohler et al. ............... 717/104 |
| 5,261,095 A | 11/1993 | Crawford et al. .......... 717/149 |
| 5,339,430 A | 8/1994 | Lundin et al. ............. 719/332 |
| 5,369,766 A | 11/1994 | Nakano et al. ............ 719/332 |
| 5,408,665 A | 4/1995 | Fitzgerald ................. 717/163 |
| 5,410,698 A | 4/1995 | Danneels et al. .......... 719/331 |
| 5,581,764 A * | 12/1996 | Fitzgerald et al. ......... 709/223 |
| 5,613,120 A | 3/1997 | Palay et al. ............... 717/165 |
| 5,649,204 A | 7/1997 | Pickett .................... 717/167 |
| 5,706,502 A | 1/1998 | Foley et al. ............... 707/10 |
| 5,821,927 A | 10/1998 | Gong ...................... 715/822 |
| 5,835,777 A * | 11/1998 | Staelin .................... 717/175 |
| 5,911,071 A * | 6/1999 | Jordan .................... 717/108 |
| 5,960,204 A | 9/1999 | Yinger et al. ............. 717/176 |
| 5,966,702 A * | 10/1999 | Fresko et al. ............. 707/1 |
| 6,185,733 B1 | 2/2001 | Breslau et al. ............ 717/163 |
| 6,199,196 B1 * | 3/2001 | Madany et al. ........... 717/165 |
| 6,247,175 B1 * | 6/2001 | Ledford et al. ............ 717/157 |
| 6,272,674 B1 * | 8/2001 | Holiday, Jr. .............. 717/174 |
| 6,314,566 B1 | 11/2001 | Arrouye et al. ........... 717/148 |
| 6,336,122 B1 * | 1/2002 | Lee et al. ................. 707/204 |
| 6,339,841 B1 * | 1/2002 | Merrick et al. ........... 717/166 |
| 6,349,344 B1 * | 2/2002 | Sauntry et al. ........... 719/332 |
| 6,381,742 B2 * | 4/2002 | Forbes et al. ............. 717/176 |
| 6,389,589 B1 * | 5/2002 | Mishra et al. ............ 717/170 |
| 6,470,494 B1 * | 10/2002 | Chan et al. .............. 717/166 |
| 6,493,870 B1 * | 12/2002 | Madany et al. ........... 717/165 |
| 6,571,388 B1 * | 5/2003 | Venkatraman et al. .... 717/166 |
| 6,591,418 B2 | 7/2003 | Bryan et al. ............. 717/177 |

(Continued)

OTHER PUBLICATIONS

Monson-Haefel, Richard. "Enterprise JavaBeans." Jun. 1999. pp. 30-33, 89-91.*

(Continued)

*Primary Examiner*—Lewis A. Bullock, Jr.
(74) *Attorney, Agent, or Firm*—Merchant & Gould P.C.

(57) ABSTRACT

A customized library management method and system generates a customized class library needed for executing an application in a client system. In response to an identification of a given application, the server determines the appropriate classes and methods to include in a library to be sent to the client based on certain parameters. The customized class library includes classes that are required by the application and that are not yet loaded on the client. The requested application and the customized class library are then transmitted to the client for execution. Within a customized class library management system, a client system can deflate, delete and regenerate applications and class libraries in accordance with resource requirements of the client and other criteria.

29 Claims, 14 Drawing Sheets

U.S. PATENT DOCUMENTS

| | | | |
|---|---|---|---|
| 6,732,142 B1 | 5/2004 | Bates et al. | 709/203 |
| 6,918,106 B1* | 7/2005 | Burridge et al. | 717/100 |
| 7,062,765 B1* | 6/2006 | Pitzel et al. | 717/177 |
| 2002/0055910 A1* | 5/2002 | Durbin | 705/64 |
| 2002/0103810 A1* | 8/2002 | Menachemi et al. | 707/102 |
| 2004/0015953 A1* | 1/2004 | Vincent | 717/173 |
| 2004/0055005 A1* | 3/2004 | Creswell et al. | 719/315 |
| 2004/0060058 A1* | 3/2004 | Liang et al. | 719/331 |

OTHER PUBLICATIONS

IBM Technical Disclosure Bulletin. "Method to Update Java Class Library in Client Computer at Runtime." May 1, 2001.*

Conte, Marie T. et al. "A Study of Code Reuse and Sharing Characteristics of Java Applications." Workshop on Workload Characteristics, Micro-31. Nov. 1998.*

Krintz, Chandra et al. "Reducing Transfer Delay Using Java Class File Splitting and Prefetching." UCSD Technical Report. Mar. 1999.*

Hovemeyer, David et al. "More Efficient Network Class Loading through Bundling." In Proceedings of the USENIX JVM'01 Conference, Apr. 2001.*

Newsome, Matt et al. "Proxy Compilation of Dynamically Loaded Java Classes with MoJo." ACM SIGPLAN 2002 Joint Conference. Jun. 2002.*

IBM, Reconciling a file system to a point in time using incremental backup data, Feb. 1, 2000.

Moons, et al., Object migration in a heterogeneous world —a multi-dimensional affair, IEEE, 1993, pp. 62-72.

* cited by examiner

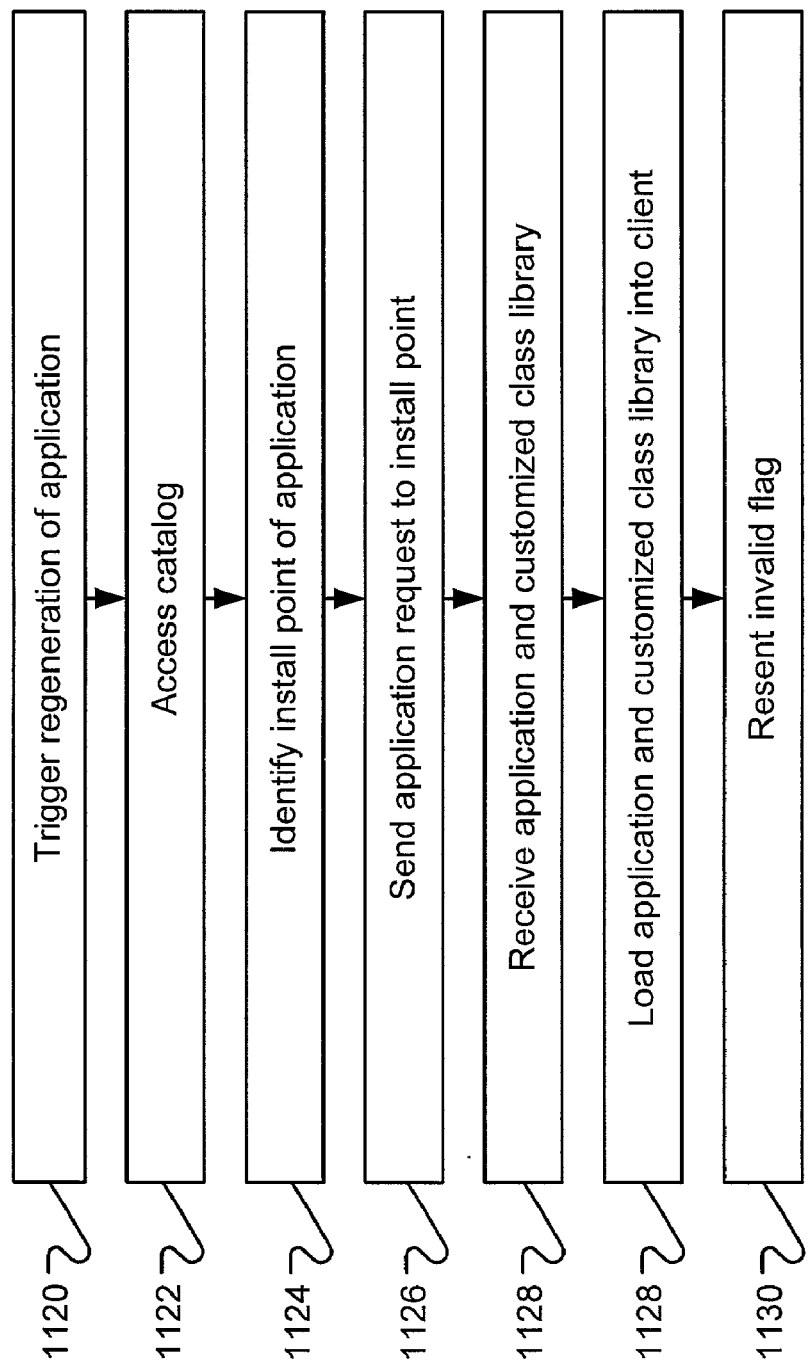

CUSTOMIZED LIBRARY MANAGEMENT SYSTEM

CROSS-REFERENCE TO RELATED APPLICATIONS

This application is related to U.S. patent application Ser. No. 09/861,844 entitled 'APPLICATION DEFLATION SYSTEM AND METHOD" filed concurrently herewith and assigned to the Assignee of the present application.

TECHNICAL FIELD

The invention relates generally to loading of software in a computer system, and more particularly to generating and maintaining customized libraries in an execution environment of a computer system.

BACKGROUND OF THE INVENTION

A client computer system can request an application from a server computer system. Such a request can be transmitted remotely, such as via the Internet, or issued locally, such as within local area network. In a runtime system, the requested application may depend on classes, methods, data fields, and resources created by other developers. These classes, methods, data fields, and resources may be referred to as "types" and are often packaged together with other types into collections called "libraries". In existing approaches, the server sends the application to the client, in response to the client's request. In addition, any statically recorded libraries associated with the application must also be sent and loaded on the client.

Typically, a statically recorded library is a unit of distribution for these types. However, all of the types in a library may not be required by a given application. For example, a given application may depend on only a single type from a given library. As such, the unneeded types in a library can waste system resources when the entire library is loaded on a client system. Wasted resources are of particular concern in compact devices, such as mobile phones and PDA's (personal digital assistants).

In addition, distributing a library to a client system can require considerable bandwidth. For example, if a client system downloads via the Internet an application and associated libraries on which the application depends, the download time and the network resources required to to perform the download are often nontrivial. Furthermore, the library or individual types within the library may already be loaded on a client system, which makes the downloading of the entire static library to the client unnecessary.

Furthermore, as resources within the client system become limited, a user traditionally must selectively delete files, including applications and libraries, from the client system to make room for new applications and libraries. However, it is difficult for a user to determine which applications and libraries are expendable. Furthermore, many libraries are shared by multiple applications. As such, it is difficult for a user to keep track of the dependencies required to safely delete unwanted libraries without disabling an essential application.

SUMMARY OF THE INVENTION

Embodiments of the present invention solve the discussed problems by providing a customized library system to minimize wasted resources on a client system. The system can generate customized libraries associated with a requested application and a target client. Types that are not needed by the client to execute the requested application are not sent to the client with the application. Instead, the customized library includes only application-referenced types that are not already loaded on the client. Alternatively, the customized library includes only application-referenced types and application-referenced methods of those that are not already loaded on the client.

When available client resources decrease to a point where additional desired applications and libraries cannot be loaded on the client system, a deflation module deletes a portion of the application to free up more client resources. The deflation module can also selectively delete any libraries or individual types on which the application and associated types were dependent, provided no other loaded application or type remains dependent on these types.

In an implementation of the present invention, a method of generating a customized library for execution of an application by a client is provided. The client includes one or more client-loaded types. One or more application-referenced types on which the application depends for execution are identified. One or more client-needed types required by the client to execute the application are also identified. The client-needed types are not yet loaded on the client. The customized library is generated to include the one or more client-needed types.

In another implementation of the present invention, a customized library management system for managing a customized class library is provided. An application server module receives an application request and transmits a requested application to a client. A customized library generator creates a customized library and sends the customized library to the client. The customized library includes one or more client-needed types.

In other implementations of the present invention, articles of manufacture are provided as computer program products. One embodiment of a computer program product provides a computer program storage medium readable by a computer system and encoding a computer program for executing a computer process that generates a customized library for execution of an application by a client. Another embodiment of a computer program product may be provided in a computer data signal embodied in a carrier wave by a computing system and encoding the computer program that generates a customized library for execution of an application by a client.

The computer program product encodes a computer program for executing on a computer system a computer process for generating a customized library for execution of an application by a client is provided. The client includes one or more client-loaded types. One or more application-referenced types on which the application depends for execution are identified. One or more client-needed types required by the client to execute the application are identified, based on the application-referenced types and the client-loaded types. The customized library including the one or more client-needed types is generated.

These and various other features as well as other advantages, which characterize the present invention, will be apparent from a reading of the following detailed description and a review of the associated drawings.

BRIEF DESCRIPTION OF THE DRAWINGS

FIG. 11B illustrates operations for regenerating an application on a client system in an alternative embodiment of present invention.

DETAILED DESCRIPTION OF THE INVENTION

An embodiment of the present invention includes a customized library management method and system for generating a customized library needed for execution of an application in a client system. In response to an identification of a given application, such as a request from the client system or an internal instruction of the server, the server determines the appropriate types to include in a library to be sent to the client based on certain parameters. The parameters may include, for example, the types referenced by the application, the types already loaded on the client system, and a device profile describing characteristics of the client system. The customized library includes types that are required by the application and that are not yet loaded on the client. The requested application and the customized library are then transmitted to the client for execution.

In another embodiment of the present invention, a client system can deflate, delete and regenerate applications and libraries in accordance with resource requirements of the client and other criteria. In one embodiment, after an application is loaded in the client system, a deflation module in the client system can delete part of the application (e.g., leaving a manifest stub that indicates the install point of the application) to make additional resources available for new files. Alternatively, the install point indicator can be maintained in a catalog so that the manifest stub is unnecessary.

If the client requests execution of the application, a regeneration module in the client accesses the manifest stub associated with the application and sends an application request to the install point specified in the manifest stub or catalog. The server at the install point receives the application request and sends the requested application and an associated library to the client to allow execution of the application. The associated library may be a static library or a customized library generated by a customized library management system.

Figure 1:
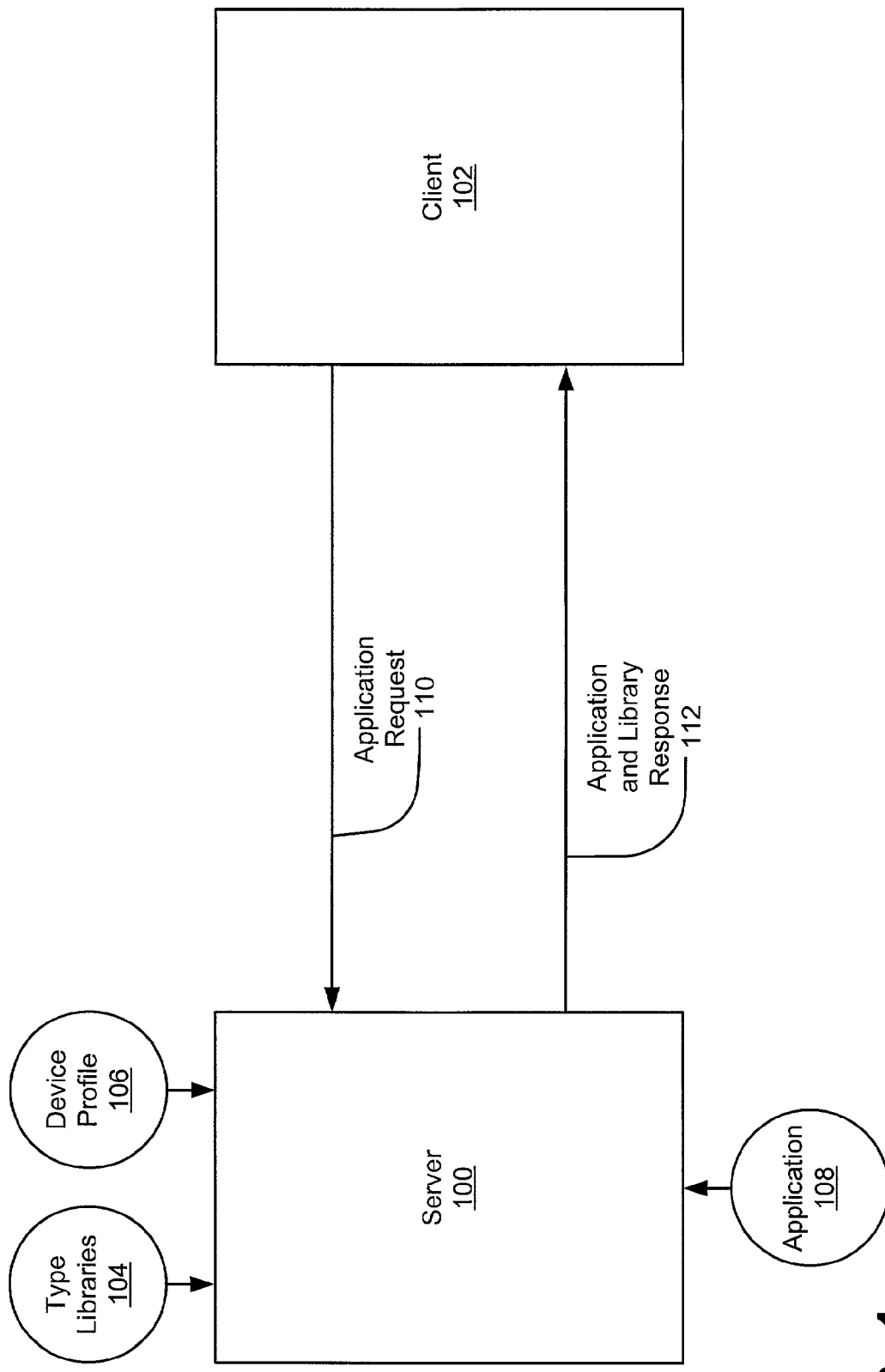
FIG. 1 illustrates a customized type library management system in an embodiment of the present invention.

FIG. 1 illustrates a customized library management system in an embodiment of the present invention. A server 100 includes a computer system that provides applications and supporting libraries upon request to a client 102, which can also request applications from other servers (not shown). As shown, the client 102 provides an application request 110 to the server 100, providing identification of a requested application. The server 100 receives the application request 110 and locates the application 108 in accordance with the identification information associated with the application request 110.

The application 108 may reference one or more libraries 104 or types that provide needed functionality to the application. Typically, these libraries are distributed to the server separately from the application 108 and are often developed by a different publisher. In one embodiment of the present invention, the references may include fully qualified assembly names. In alternative embodiments, however, the application code and the library code may be analyzed to resolve the references, even without fully qualified assembly names.

In addition, a device profile 106 may be input to the server 100 to identify relevant characteristics and limitations of the client 102. In one embodiment of present invention, the device profile 106 is sent by the client 102 to the server 100 in association with the application request 110. In alternative embodiments, the device profile 106 may be obtained by the server 100 independently of the application request 110. For example, in one embodiment, the server 100 maintains device profile information for all clients that it supports. Accordingly, the server 100 can use this internally maintained device profile information when customizing a library associated with a requested application.

Upon receiving the application request 110, the server 100 generates a customized library in association with the requested application 108. Parameters such as the types referenced by the application 108, (optionally) a device profile 106, and the identity of classes already loaded by client 102 may processed by the server 100 to generate a customized library. The application 108 and the customized library are transmitted to the client 102 in the application and library response 112.

Figure 2:
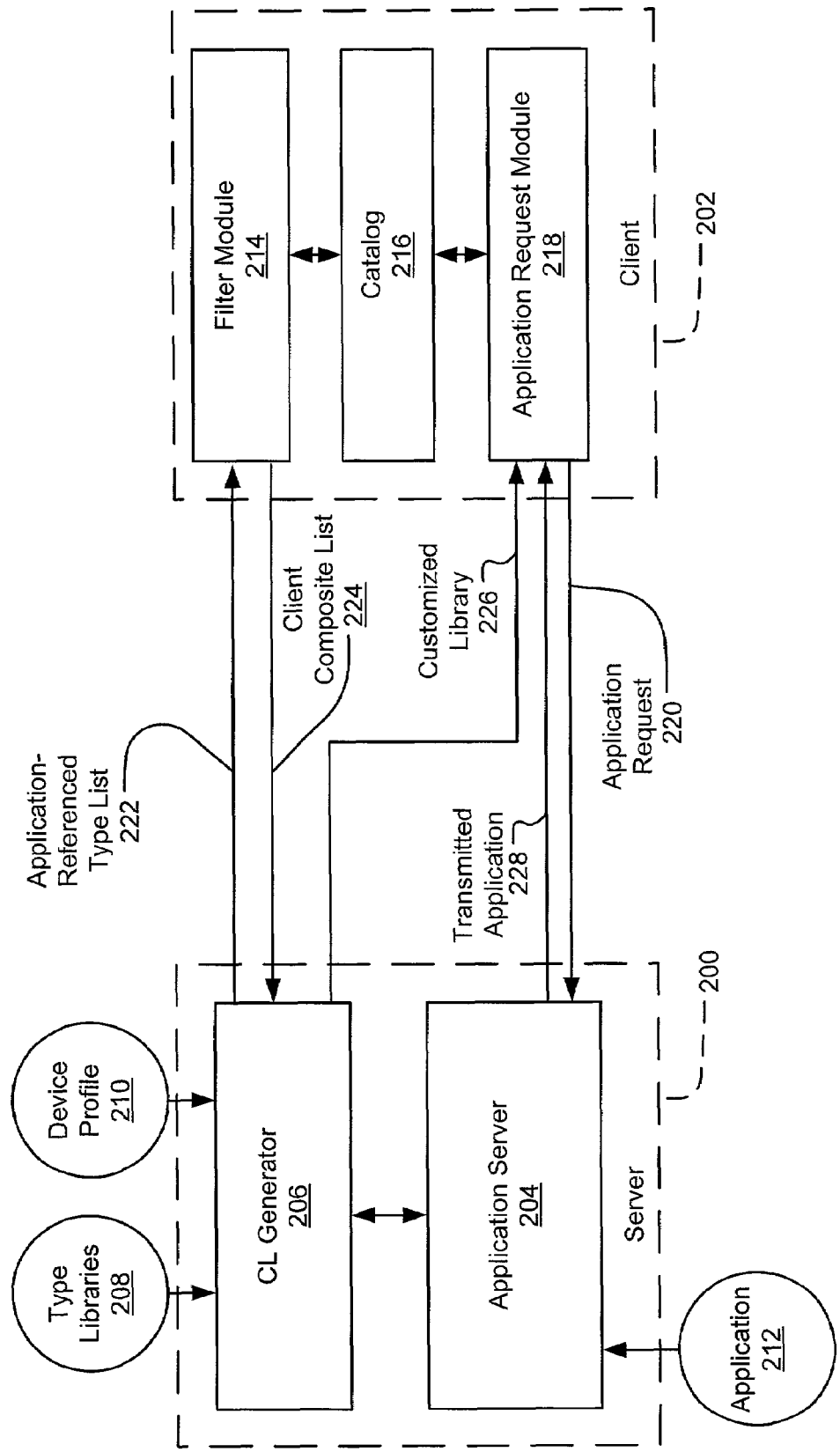
FIG. 2 illustrates modules and communications for generating a customized library in an embodiment of the present invention.

FIG. 2 illustrates modules and communications for generating a customized library in an embodiment of the present invention. A server 200 includes an application server 204 that receives an application request 220 from a client 202 (e.g. as shown, from an application request module 218 executing in the client 202). In one embodiment of the present invention, the application server 204 also transmits the transmitted application 228 to the client 202. The server 200 also includes a customized library (CL) generator 206, which is in communication with the application server 204.

Responsive to the application request 220, one or both of the CL generator 206 and the application server 204 analyze the application 228 retrieved from an application data store 212 to identify types referenced therein. In one embodiment of the present invention, the application references types using fully qualified names. Accordingly, by extracting the references, the CL generator 206 or application server 204 can search the library datastore 208 to identify the application-referenced types. Furthermore, type dependencies originating from the application-referenced types are recursively added as application-referenced types to assure that all directly or indirectly referenced types are resolvable. In alternative embodiments, the application-referenced types may be identified by parsing the application binary representation or associated portion thereof (e.g., a symbol table associated with the application or debug information).

The types referenced by the application 228 are included in the libraries 208 and accessible by the server 200. The application-referenced types are listed in an application-referenced type list 222 (also referred to as a dependency list), which is transmitted to the client 202 in the illustrated embodiment of the present invention. It should be understood that these operations may be allocated to the CL generator 206 or the application server 204 within the scope of the present invention.

The application-referenced type list 222 is received by a filter module 214. In the illustrated embodiment, the filter module is located in the client, although the filter module may alternatively be located in the server or some other system. The filter module 214 compares the application-referenced type list 222 against a catalog 216, which in one embodiment contains a description of the types already loaded on the client 202. As a result of this comparison, the filter module 214 generates a client composite list 224, which identifies those types required by the application 228, as specified by the application-referenced type list 222, that are not already loaded on the client 202. It should be understood that filtering can be done with varying levels of granularity (e.g., a library level, a class level, a method level, or a data field level) within the scope of the present invention.

The CL generator 206 receives the client composite list 224 and generates a customized library based on the needed types identified in the client composite list 224 received from the client or the server. Types that are not identified as a client-needed type (i.e., non-identified types) may be excluded from the customized class library. In one embodiment the present invention, the manifest information, metadata, code, and resource information required for generating the customized library may be extracted from the type libraries 208 by the CL generator 206.

Furthermore, information specifying the characteristics of the client device 202 may be input from the device profile 210 and used to alter the composition of the customized library that is generated for the target client device 202. In one embodiment of the present invention, the device profile 210 describes configuration characteristics and limitations of the client system. For example, a device profile may include a device name, a serial number, a device type, a device base type, a listing of capabilities supported by the device (e.g., graphics capability, sound capability, etc.), a listing of limitations of the device (e.g., web services not supported) or a listing of preferences (e.g., graphics preferences). As such, the CL generator 206 can use the device profile 210 to make specific inclusions, omission, or configurations in the customized library based on the device profile information. It should be understood, however, that a customized library management system may exclude receipt and/or consideration of a device profile in an embodiment of the present invention.

One method of applying the device profile 210 to the generation of a customized library involves attributes associated with certain classes, methods, and data fields. For example, a type may be designated with a DEBUG attribute, meaning that the type includes debug functionality used in development of an application. However, in a commercial cell phone of a non-developer, the debug code could be a significant waste of space. As such, if the CL generator 206 does not detect a "DEBUG" characteristic in the device profile 210, the CL generator 206 can chose not to include any "DEBUG" types in the customized library, thereby optimizing the use of resources in the client device. In one embodiment the CL generator 206 selects alternative non-debug types to substitute for the "DEBUG" types in the customized library. As such, the CL generator 206 can use a device profile to selectively include individual types into the customized library for a given client device. In one embodiment, there may exist multiple type candidates for a given application reference, wherein the device profile information may be used to select an appropriate type among the available candidates. In this manner, a developer can automatically optimize functionality and required resources of an application and library based on the specified characteristics of the client device.

In another example, the device profile 210 may indicate that a client device does not support web services. However, a client-needed library may include types that are associated with a "WEB SERVICES" attribute. Accordingly, the WEB SERVICES attribute may be excluded from a customized library targeted for the client device. In this manner, because the WEB SERVICES attribute is missing, the client does not combine WEB SERVICES support code with the client-needed type.

The device provide 210 can have many forms, including without limitation a flat format merely listing device characteristics and a hierarchical format describing relationships among characteristics. In one embodiment, a device profile can explicitly specify device characteristics (e.g., 640×480 RESOLUTION) to cause the loading or attributing of specific types on the client. In an alternative embodiment, a device profile can relatively specify device characteristics (e.g., NO MORE THAN 640×480 RESOLUTION, NO LESS THAN 640×480 RESOLUTION, or BETWEEN 320×240 and 1024×768) to set one or more limits on a given characteristic. Using the device profile, the CL generator 206 can select or attribute types that conform to the specified device characteristics.

In one particular embodiment, a device of a given brand "X" can specify its component part numbers or model number in its device profile to receive vendor-specific updates to required types. In yet another embodiment, if a needed vendor-specific update is unavailable from the server, the CL generator 206 may discern relationships (e.g., generic and vendor-specific) among required and available types based on the device profile 210 and automatically select a compatible type for loading on the client device via the customized library 206.

The resulting customized library 206 is transmitted to the application request module 218 (or an application receipt module) in association with the transmitted application 228. The application 228 and the types contained within the customized library 206 are registered with the catalog 216 to maintain the integrity of the information contained therein. This registering operation may also be referred to as "merging", because various customized libraries may include distinct portions of a type. As such, the registering operation can merge these portions of a type into a single logical type.

It should be understood that in one embodiment of the present inventions, the CL generator 206 and the catalog 216 operate on a level of granularity limited to classes. That is, for example, the CL generator 206 can generate only a list of application-referenced classes and the catalog 216 can record only client-loaded applications and classes. In an alternative embodiment of the present invention, however, the CL generator 206 can also include in the application-referenced type list a listing of application-referenced methods and/or data fields. Likewise, the catalog 216 can include also dependency information relating to client-loaded methods and/or data fields. In this embodiment, the level of granularity is focused to a method-level and/or data field-level, thereby further reducing the use of resources to methods and/or data fields actually referenced by the requested applications that are included in the customized library. Likewise, tracking of client-loaded methods and/or data fields can also optimize the "deflation" operations at the client, as discussed with regard to FIGS. 9A-11B.

Alternative embodiments of the present invention are also contemplated. In one such embodiment, the client sends a list of all of the types that are loaded on the client. In response, the server identifies the client-needed types by comparing the list of client-loaded types to a list of application-referenced types. As a result, the client-needed types may be inserted into the customized library and be sent to the client in association with the application. Alternatively, a union of the client-loaded types and the client-needed types may be inserted into the customized library and be sent to the client. This embodiment allows the client to merely replace its existing client-loaded types with the customized library.

Figure 3:
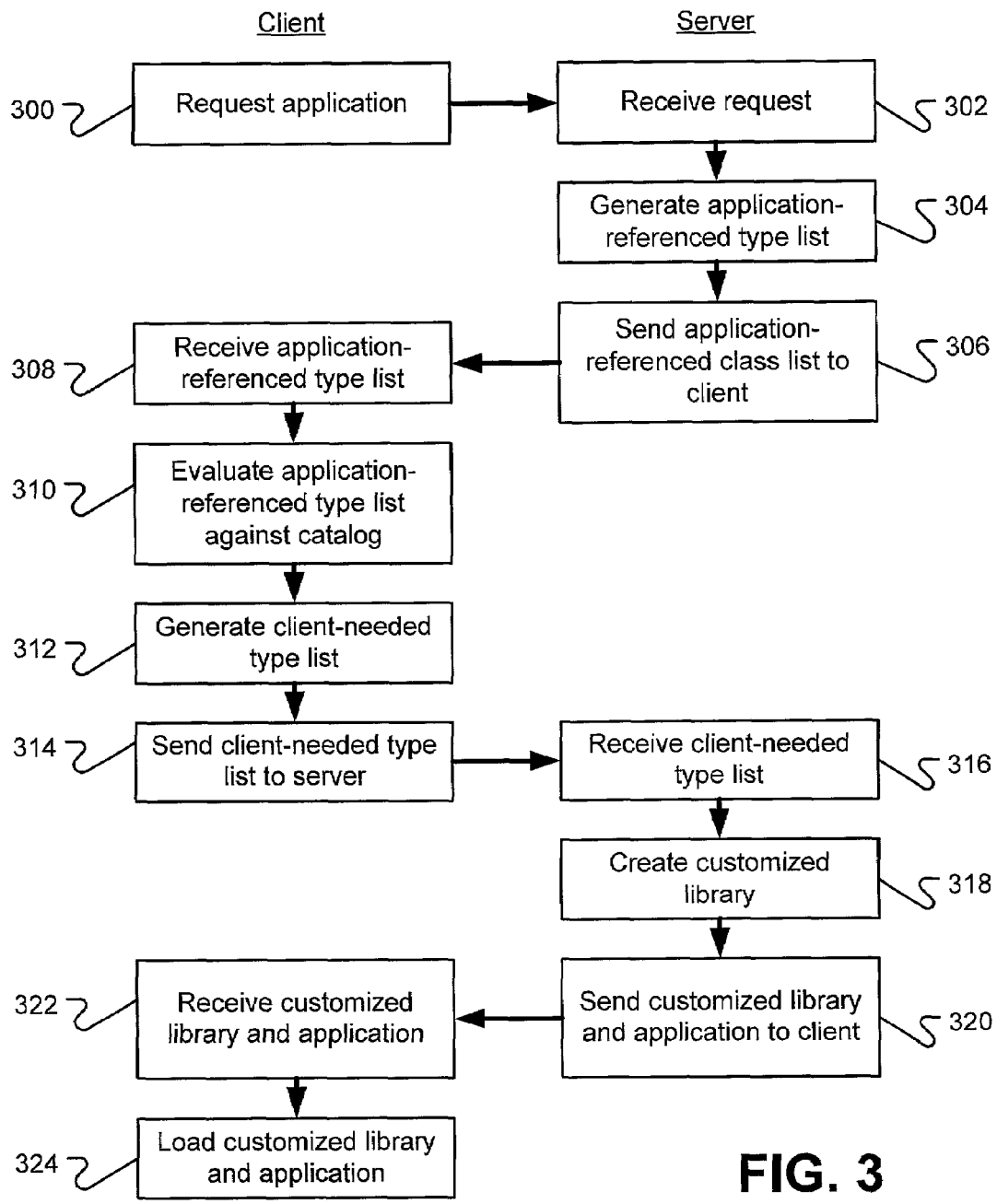
FIG. 3 illustrates operations for generating a customized library in an embodiment of the present invention.

FIG. 3 illustrates operations for generating a customized library in an embodiment of the present invention. The operations illustrated in FIG. 3 are designated as being "client" operations (i.e., those operations on the left of FIG. 3) or "server" operations (i.e., those operations on the right of FIG. 3). It should be understood however, that the illustrated flow diagram is exemplary and some operations may be omitted, reordered, or performed by a different system than is illustrated.

Requesting operation 300 requests an application from a source. In the illustrated embodiment, the request is originated by the client and transmitted to the server, which receives the request in a receiving operation 302. Generating operation 304 accesses the requested application and generates an application-referenced type list. In one embodiment, the generating operation 304 evaluates the application code to generate a list of types referenced within the application code. In alternative embodiments, the application-referenced type list may be statically loaded on the server when the application is initially installed on the server, may be accessed remotely by the server from another system, or may be generated responsive to a first application request and then cached for use with subsequent application requests until the cache resources are required for other storage or the application and type dependency information changes (e.g., a new version of an application or type is loaded on the server).

The application-referenced type list is transmitted by the sending operation 306 from the server to the client, where it is received by the receiving operation 308. Evaluation operation 310 evaluates the application-referenced class list against the catalog, which specifies types already loaded on the client. Generating operation 312 generates a client-needed type list specifying the application-referenced types not already loaded on the client. Transmission operation 314 transmits the client-needed type list to the server, where it is received by receiving operation 316. Creation operation 318 generates a customized type library, based on the client composite list received from a client and types extracted from the type library store (see type libraries 208 in FIG. 2).

Transmission operation 320 sends the customized library and the requested application to the client, where they are received in receiving operation 322. Loading operation 324 loads the customized library and the application into the client and records the new application and types into the catalog.

Figure 4:
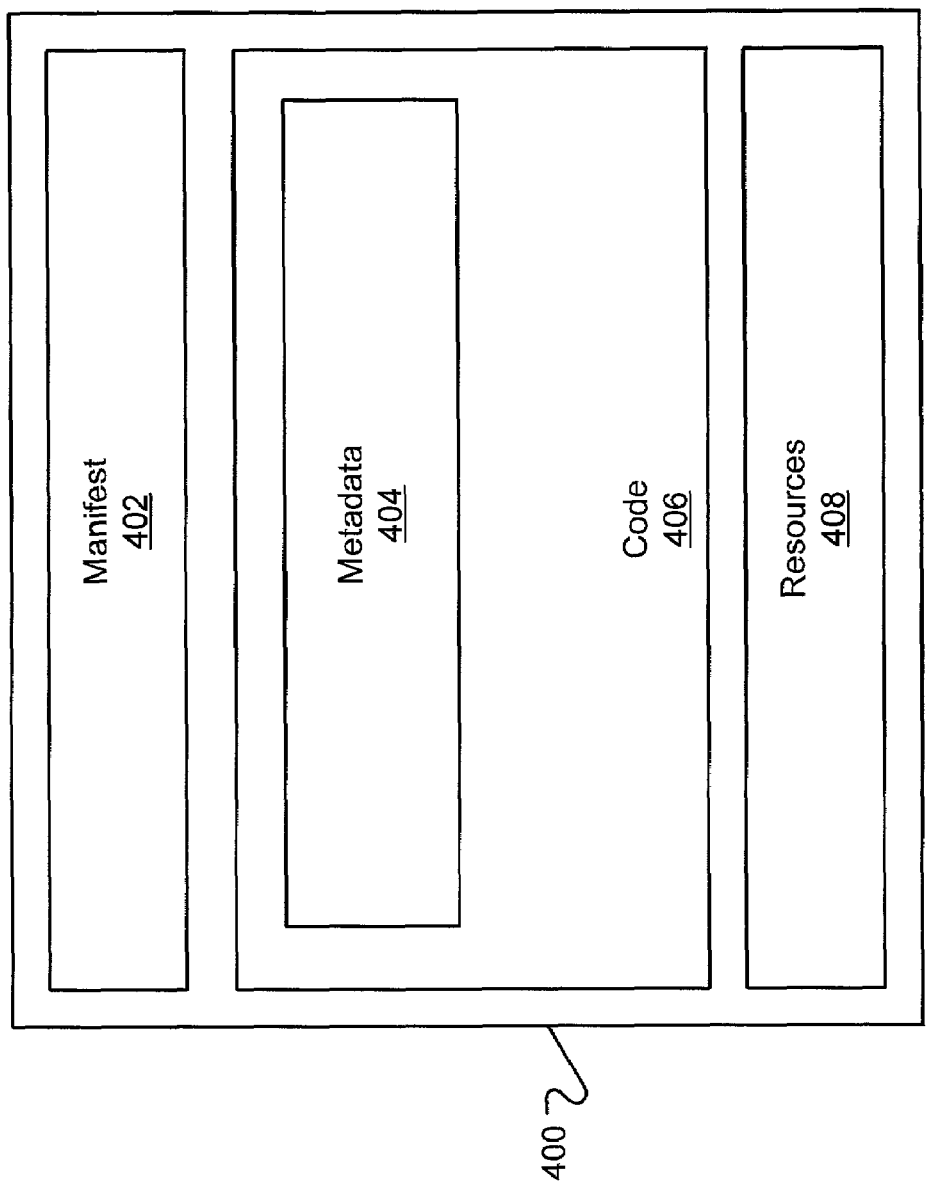
FIG. 4 depicts a schematic of an exemplary library generated in an embodiment of the present invention.

FIG. 4 depicts a schematic of an exemplary library generated in an embodiment of the present invention. A library 400 may contain individual sections describing the types collected in the library. A library is a type of assembly. A manifest 402 contains descriptions of one or more characteristics of the library 400. The code section 406 includes program code implementing the types within the library 400. The metadata section 404 describes the data and code within the code section 406. For example, metadata may describe a signature of a given method, including the method name, associated class, return value identifiers, return values types, input parameters identifiers and input parameter types. The resource section 408 includes other resources or files, such as an image, sound, icon, etc. When a library is created, the sections 402, 404, 406, and 408 may be recorded in a library file or some other data store representation. In addition, a library can include multiple classes, methods, data fields, and resources.

In an embodiment of the present invention, an assembly's manifest can initially contain information on all elements considered part of an assembly. The manifest can indicate what elements are exposed outside of the assembly and what elements are accessible only within the current assembly's scope. The assembly's manifest may also contain a collection of references to other code assemblies. These references are resolved by the runtime system based on information stored in the manifest. Typically, all files that make up the assembly are listed in a manifest; however, a listing of all files are not required within the scope of the present invention.

From an external view (i.e. that of the assembly consumer), an assembly is a named and version-constrained collection of exported types and resources. From the internal view (i.e. that of the assembly developer), an assembly is a collection of one or more files that implement types and resources. Each assembly's manifest enumerates the files that make up the assembly and governs how references to the assembly's types and resources are mapped to the files that contain their declarations and implementations. The manifest also enumerates other assemblies on which the current assembly depends. The existence of a manifest provides a level of indirection between consumers of the assembly and the implementation details of the assembly and by making assemblies self-describing.

In an embodiment of the present invention, a manifest may contain, without limitation, the following information:

Assembly name—a textual string name of the assembly.

Version information—a major and minor version number, and a revision and build number. These numbers are used by the runtime system when enforcing version policy.

Shared name information—contains the public key from the publisher and a hash of the file containing the manifest signed with the publisher's private key.

Cultures processor and OS supported—contains information on the cultures, processors, and operating systems the assembly supports.

List of all files in the assembly—consists of a hash of each file contained in the assembly and a relative path to the file from the manifest file.

Type reference information—contains information used by the runtime system to map a type reference to the file that contains its declaration and implementation.

Information on referenced assemblies—contains a list of other assemblies that are statically referenced by the assembly. Each reference includes the dependent assembly's name, metadata (version, culture, OS, etc.), and public key if the assembly is shared.

Install Point—an indicator of the location from which the application was installed (e.g., a URL of the web site from which the application was requested).

A developer can also set, in code, custom assembly attributes for assemblies or types contained therein. Custom attributes can include, without limitation, attributes such as:

Title—Provides a friendly name, which can include spaces. For example, the assembly name of an assembly might be "comdlg," while the assembly title would be "Microsoft Common Dialog Control."

Description—a short description of the assembly.

Default Alias—Provides a friendly default alias in cases where the assembly name is a GUID (Globally Unique IDentifier).

Configuration information—consists of a string that can be set to any value for configuration information, such as Retail or Debug.

Product information—such as Trademark, Copyright, Product, Company, and InformationalVersion.

Typically, a library is statically generated as part of the compilation, linking, and distribution processes associated with developing an application. However, it is now common for multiple applications to share one or more libraries, which may be distributed to an application server separately from the applications themselves. Accordingly, libraries, while often being distributed to the server separately from the application, may be required by one or more applications on a client. In addition, in order for the application to execute properly, the appropriate libraries must be distributed to the client in association with any application that references a type within the libraries. The application-referenced types contained within the libraries are then invoked when called by one or more of the applications.

Figure 5:
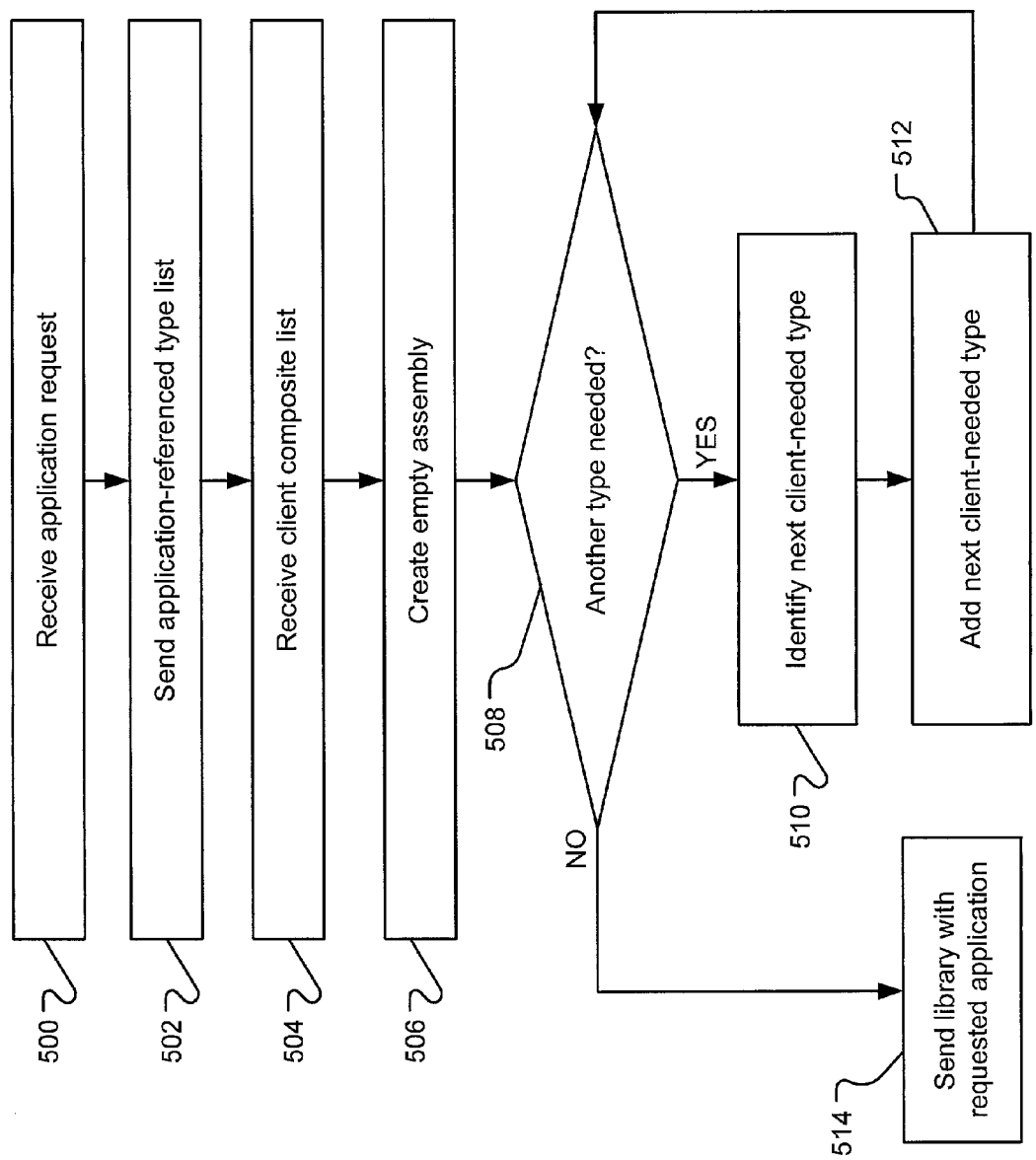
FIG. 5 illustrates operations for creating a customized library in an embodiment of the present invention.

FIG. 5 illustrates operations for creating a customized library in an embodiment of the present invention. Receiving operation 500 receives request for an application. Such a request may be received from a client by the server, such as through an Internet connection. Alternatively, such a request may be received internally by an application server module within the server, wherein the request is internally generated or received from an alternative source. For example, an application server module serving applications to multiple set-top boxes in a region may receive a command (i.e., an application request) from a central servicing center to update the multiple set-top boxes with a new version of an application.

Sending operation 502 can analyze the requested application to identify types referenced by the application. The identified types specified in an application-referenced type list, which is sent to the client in sending operation 502. Once generated the application-referenced type list may be cached or stored at the server for future application requests from this client or other clients. Alternatively, the application-referenced type list may be regenerated for each application request received by the server. Receiving operation 504 receives a client composite list specifying the types that are included in the application-referenced type list but are not already loaded in the target client.

In an alternative embodiment, the application-required type list need not be sent to the client. For example, the server may maintain, or otherwise access, a list of types already loaded on the target client. Therefore, the server can analyze the application-referenced type list and its own list of types already loaded on the target client to internally generate a client composite list.

Creation operation 506 creates an empty assembly, which will become the customized library as types are added to it. Decision operation 508 evaluates the client composite list to determine whether another type is to be added to the customized library. Identification operation 510 identifies the next client-needed class to be added to the customized library. Addition operation 512 adds the next client-needed class to the customized class library. If decision block 508 determines that no additional classes are to be added to the customized library, transmission operation 514 sends the customized library to the client in association with the requested application.

Figure 6:
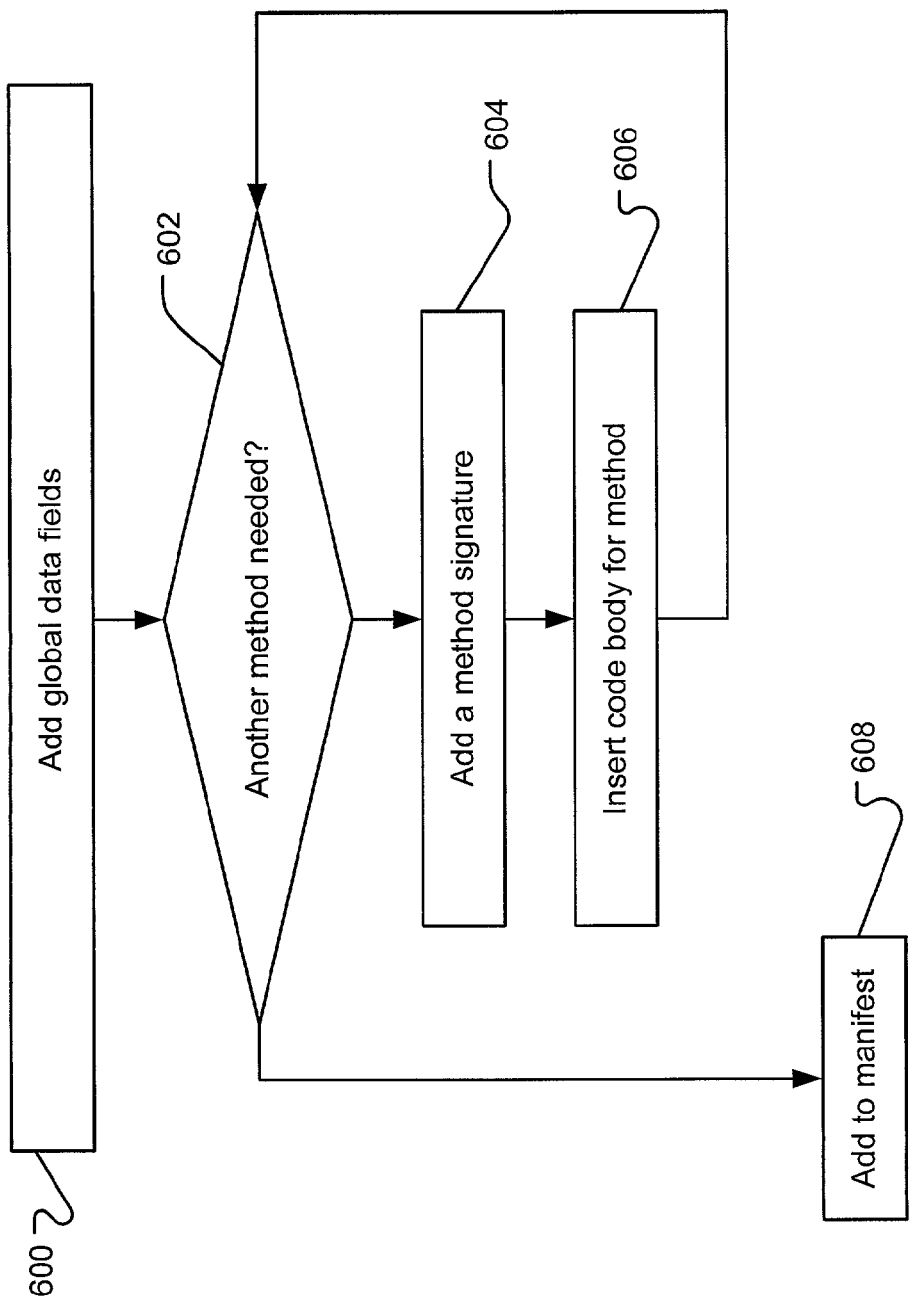
FIG. 6 illustrates operations for adding a type to a customized library in an embodiment of the present invention.

FIG. 6 illustrates operations for adding a type to a customized library in an embodiment of the present invention. When it is determined that a new type is to be added to a customized library (or an empty assembly), as shown in block 508 and 510 of FIG. 5, the operations of FIG. 6 add the type to the customized library in an embodiment of the present invention. The data and instructions (i.e., code) used to add the new type are extracted from an existing source type library datastore, as represented by the type libraries 208 of FIG. 2.

Addition operation 600 extracts all global data fields from the corresponding class in the source class library datastore and adds them to the customized class library. Global data fields represent fields accessible by all methods of a class (i.e., excluding local data fields of individual methods). Decision operation 602 determines whether another method is to be added to the class. In this embodiment, class libraries may be customized so that only client-needed methods for a given application are included in the customized types library. For example, those types not referenced by the requested application are excluded from the customized library. Likewise, those types already loaded on the client are also excluded from the customized type library. In an alternative embodiment, the level of customizing granularity can be limited to the class level, so that all methods data fields of a client-needed class are included in the customized library. In yet another alternative, global data fields may also be filtered to exclude those global data fields not referenced by the methods of the class that are added to the customized library.

Application-referenced types that are initially added to the customized library may also reference other types that are not yet included in the customized library. As such, newly added types in the evolving customized library are also analyzed to determine other types that may be referenced therein. This recursive analysis assures that all client-needed types, including those types internally referenced by other client-needed types, are included in the customized class library.

In accordance with the decision from the decision operation 602, addition operation 604 adds a method signature corresponding to the needed method. The method signature is extracted from the source type library data store and inserted into the customized library. Insertion operation 606 extracts the method code body from the source type library datastore and inserts it into the customized library. If no additional method is required for the current class, as determined by the decision block 602, an updating operation 608 updates information in the manifest of the customized library, if needed, to update the characteristics of the customized library.

Figure 7:
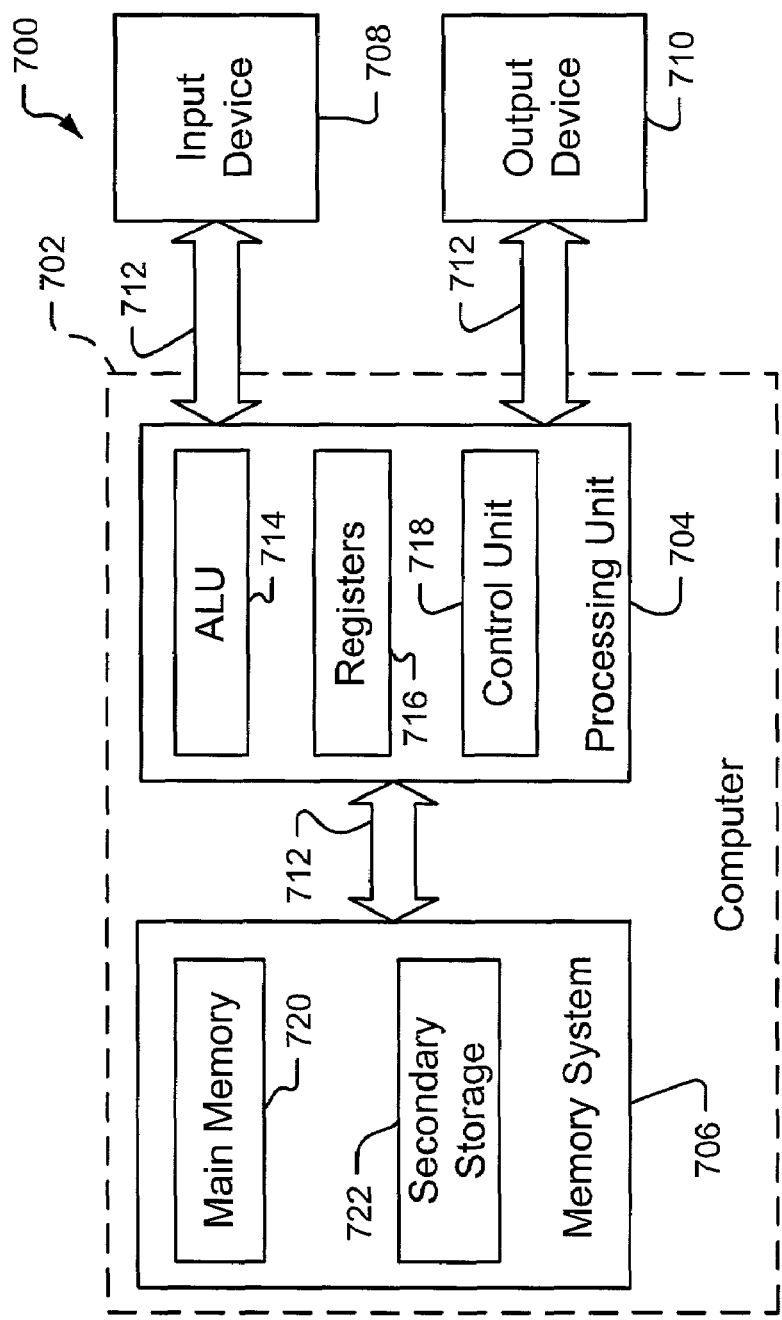
FIG. 7 illustrates an exemplary system useful for implementing an embodiment of the present invention.

With reference to FIG. 7, an exemplary system for implementing the invention includes a computing device, such as computing device 700. In its most basis configuration, computing device 700 typically includes at least one processing unit 704 and memory 706. In the illustrated embodiment, the exemplary processing unit 704 includes a control unit 718, registers 716, and an arithmetic logic unit 714.

A basic memory configuration is illustrated in FIG. 7 by a memory system 706. Depending on the exact configuration and type of computing device 700, main memory 720 may be volatile (such as RAM), non-volatile (such as ROM, flash memory, etc.) or some combination of the two. Additionally, device 700 may also include additional storage (removable and/or non-removable) including, but not limited to, magnetic or optical disks or tape. Such additional storage is illustrated in FIG. 7 by secondary storage 722. Computer storage media includes volatile and nonvolatile, removable and non-removable media implemented in any method or technology for storage of information such as computer readable instructions, data structures, program modules or other data. Memory 706, including main memory 720 and secondary storage 722 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 700. Any such computer storage media may be part of device 700.

Device 700 may also contain communications connection(s) 712 that allow the device to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF (radio frequency), infrared and other wireless media. The term computer readable media as used herein includes both storage media and communication media.

Device 700 may also have input device(s) 708 such as keyboard, mouse, pen, voice input device, touch input device, etc. Output device(s) 710 such as a display, speakers, printer, external network devices, etc. may also be included. All these devices are well known in the art and need not be discussed at length here.

Devices, such as personal digital assistants, web tablets, and mobile communication devices (e.g., mobile phones), are examples of devices in which the present invention is directed. However, other computer platforms, including desktop computers, server computers, supercomputers, workstations, dedicated controllers, and other computing devices are contemplated within the scope of the present invention. Furthermore, server and client processes may operate within a single computing device, so that multiple computers are not required within the scope of the present invention. Moreover, in a configuration utilizing multiple computing devices, connections between the devices may include wired connections, wireless connections, or combinations of both.

In an embodiment of the present invention, portions of a customizing library management system may be incorporated as part of an operating system, application programs, or other program modules that are storable in memory 706. A libraries, application, types, catalogs, lists, and device profiles may be coded into the various modules or may be stored as in memory 706 and executed or access via processing unit 704.

Figure 8:
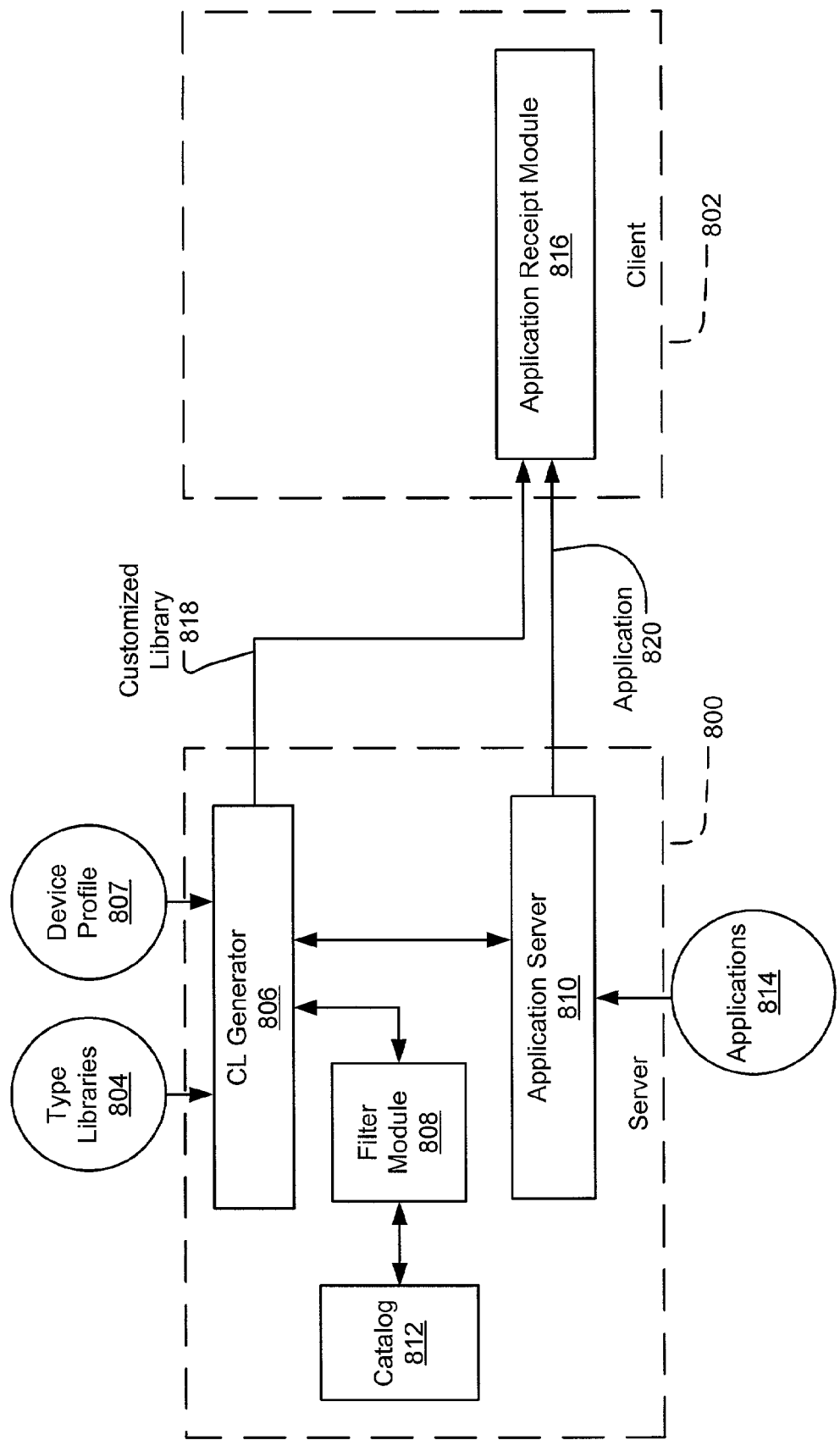
FIG. 8 illustrates modules and communications of an alternative customized library management system in an embodiment of the present invention.

FIG. 8 illustrates modules and communications of an alternative customized library management system in an embodiment of the present invention. A server 800 is coupled to a client 802 and optionally to other clients (not shown). A typical scenario in which the embodiment of FIG. 8 is particularly useful involves an application server in a "push" environment. For example, the server 800 pushes applications out to multiple clients, such as set-top boxes in a given region. The applications may include updates to existing client-based applications stored in the set-top boxes. The server 800 maintains a catalog 812 that describes the applications and types loaded on all coupled clients. In one embodiment, all clients are loaded with the same applications and types so that a single catalog describes all clients. An alternative embodiment, however, multiple catalogs may be maintained by the server, each catalog describing an individual client or individual group of clients having the same configurations.

In the illustrated embodiment, the application server 810 may, in response to a predetermined input (i.e., an application request), invoke the process of generating a customized library. In one embodiment, the application server module 810 (or the CL generator 806) analyzes the application 820, which is extracted from the applications store 814, to identify the application-referenced types. A list of application-referenced types is communicated to a CL generator 806. Alternatively, the identity of the application 820 is communicated to the CL generator 806, which performs the analysis operations and generates the list of application-referenced types. The CL generator 806 sends the application-referenced list to a filter module 808, which evaluates the application-referenced types against those types described in the catalog 812. The filter module 808 generates the list of client-needed types and transmits the list to the CL generator 806. The CL generator 806 generates a customized library 818 by extracting the appropriate classes and methods, as described in the list of client-needed types, and adding them to an assembly. The customized library 818 is then transmitted to the client 802 in association with the application 820.

A device profile 807 may also be employed by the embodiment of FIG. 8 to further customize the library to the characteristics and limitations of the client device. The device profile may be sent to the server from the client or the device profile may be stored on the server. If the device profile 807 is stored on the server, the CL generator 806 can look up an appropriate device profile using a client identifier or device type identifier.

In the illustrated embodiment, an application receipt module 816 executes in the client 802 to receive and configure any applications (see application 820) and libraries (see customized library 818) sent from the server 800. The application receipt module 816 may also separately maintain its own catalog, which may be useful for troubleshooting problems with a client.

It should be understood that many alternative embodiments in which particular operations may be allocated to either client or server. In the embodiment illustrated in FIG. 2, the filter and merging operations occur in the client, with the client composite list being passed from client to server. In FIG. 8, the filter operation occurs in the server and the merging operation occurs in the client. Also, the client composite list may specify types that are required by the client or types that are already loaded on the client. Other variations of these embodiments, however, are also contemplated within the scope of the present invention.

In one such embodiment, a client composite list specifies the application-referenced types already loaded on the client (or portions thereof). With this client composite list, the server can generate a merged customized library containing all application-referenced types plus client-loaded types, which are then transmitted to the client. In this embodiment, the client then replaces relevant previously loaded types with the newly regenerated types.

In yet another embodiment, the client may possess enough computer power to perform the all of the operations, including identification of the application-referenced types, the filtering operation, and the merging operation. In this embodiment, the server merely provides the application and any referenced libraries, and the client customizes the libraries appropriately.

Figure 9A:
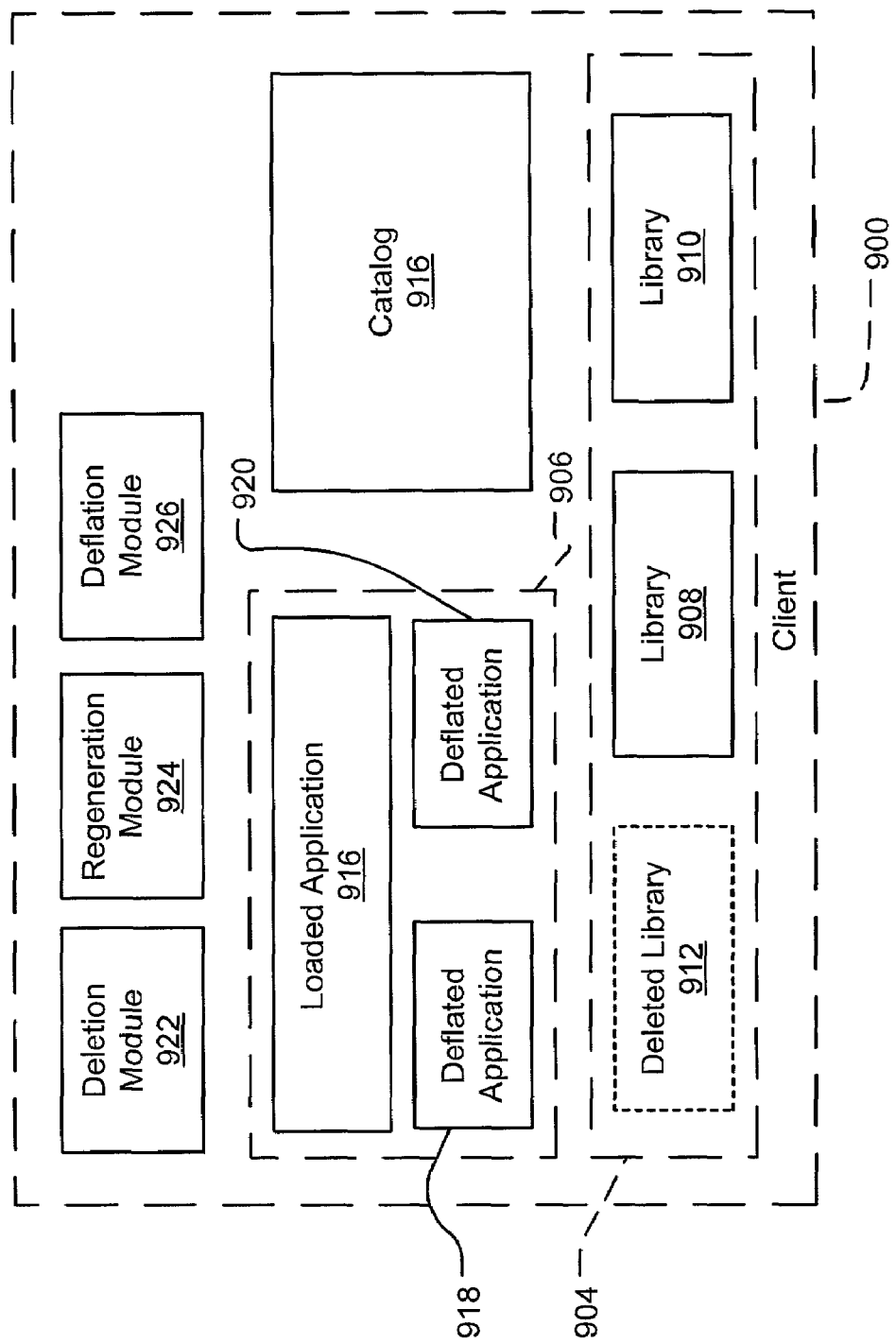
FIG. 9A illustrates modules for deflating, deleting, and regenerating applications, libraries, and types on a client system in an embodiment of the present invention.

FIG. 9A illustrates modules for deflating, deleting and regenerating applications, libraries, and types on a client system in an embodiment of the present invention. During a lifetime of client 900, many applications may be loaded on the client 900 in combination with application-referenced libraries (whether customized or not). These applications and libraries can occupy significant resources within the client. As the client's available resources decrease in response to the loading of additional applications and libraries, an embodiment of present invention can intelligently deflate appropriate applications so that the applications occupy fewer client resources. In addition, an embodiment of the present invention can automatically regenerate applications after deflation.

A catalog 916 in the client 900 maintains a list of loaded applications, libraries, and/or types. In one embodiment, the list of loaded libraries includes identification of individual types (e.g., classes, methods, and data fields) loaded on the client 900. The catalog 916 may also maintain a tracking of the least recently used (LRU) applications and types as well as the dependencies of each application or type to other libraries or types. The LRU tracking information may include, for example, the date that the application was last executed with a client system. An application having the oldest execution date may be considered the "least recently used" application and is a candidate for deflation if the available client resources become too limited.

In one embodiment, applications are loaded for execution within the client 900 in association with customized libraries. In FIG. 9A, a library storage region 904 stores loaded libraries 908 and 910, which represent fully or partially loaded libraries within the client 900. Partially loaded libraries may include particular types that are referenced by applications and other types loaded on the client. Both libraries 908 and 910 may be indicated within the catalog 916 as a dependency on one or more applications or types. The library storage region 904 is also illustrated with a deleted library 912. A deleted library represents a loaded library that has been deleted from the client and is no longer stored in the library storage region 904.

An application storage region 904 stores loaded applications and deflated applications. The illustration of logically separate application storage 906 and library storage 904 regions logically distinguishes between applications and libraries. FIG. 9A does not imply, however, that applications and libraries cannot reside in the same memory region.

An application 916 is a fully loaded application within the client 900. The application 916 is indicated as "loaded" within the catalog 916. Two applications 918 and 920 are deflated applications stored within the client 900. Both deflated applications 918 and 920 are indicated as deflated within the catalog 916. In addition, the code and resource regions of the applications 918 and 920 (and possibly some of the manifest) have been deleted from the client 900, leaving only a small portion of the manifest (i.e., a manifest stub) of each application 918 and 920 loaded within the client 900. In one embodiment, the only portion of the application remaining loaded in the client after a deflation operation is an indicator (e.g., a URL—"Uniform Resource Locator") of the install point of the application. Alternatively, other elements of the application may remain loaded on the client system within the scope of the present invention.

In response to a predetermined condition, a deflation module 926 deletes a portion of the "least recently used" application and all associated libraries that are no longer referenced by any other loaded application. The LRU tracking and dependency information stored within the catalog 916 are useful for the purposes of determining the appropriate application to deflate as well as the appropriate libraries to delete. In one embodiment, the predetermined condition includes the available client resources falling below a predetermined threshold. In an alternative embodiment, the predetermined condition includes a periodic test of the LRU tracking information, in which applications (and appropriate associated libraries) having an LRU tracking date outside a predetermined time period or having been accessed less than a given number of times over a given period are subject to deflation (i.e., an infrequently used algorithm). In yet another embodiment, the predetermined condition may concern a combination of application or type size (i.e., projected resource gain) and recent utilization to prioritize the applications and types to be deflated.

When the deflation module 926 deflates an application, the deflation module 926 may also check dependency information in the catalog 916 to determine whether the deletion of the application removes any remaining dependencies on a library or type in the library storage region 904. If so, the associated library or type is also deleted. As such, deflation of an application can also result in deletion of one or more associated libraries, thereby freeing up valuable client resources. The catalog 916 can be described as recording a count or list of applications that are dependent on a given library or type and an identity of those applications that are dependent on the library or type. Also, the catalog 916 may record the identity of the libraries or types on which a given application is dependent.

The manifest stub is important for the regeneration operation performed by the regeneration module 924. After an application has been deflated, the code for executing the deflated application is no longer loaded on the client. However, if the application is invoked, the regeneration module 924 accesses the application's install point indicator that remains loaded within the client as the "deflated" application. The regeneration module 924 then sends an application request to the install point, and the application and customized library generation process described with regard to FIGS. 1-6 is repeated to re-load the application and any client-needed types into the client 900.

A deletion module 922 is also important for managing resources on the client. A user may wish to delete an application or a licensing policy or application may include code for deleting assemblies for which a license has expired. These circumstances can result in the deletion of an application using the deletion module 922. In contrast to the deflation operation, the deletion operation deletes all of the application and then performs a deletion operation on libraries or types associated with the application (i.e., those libraries that are not also referenced by another loaded application, library, or type).

Figure 9B:
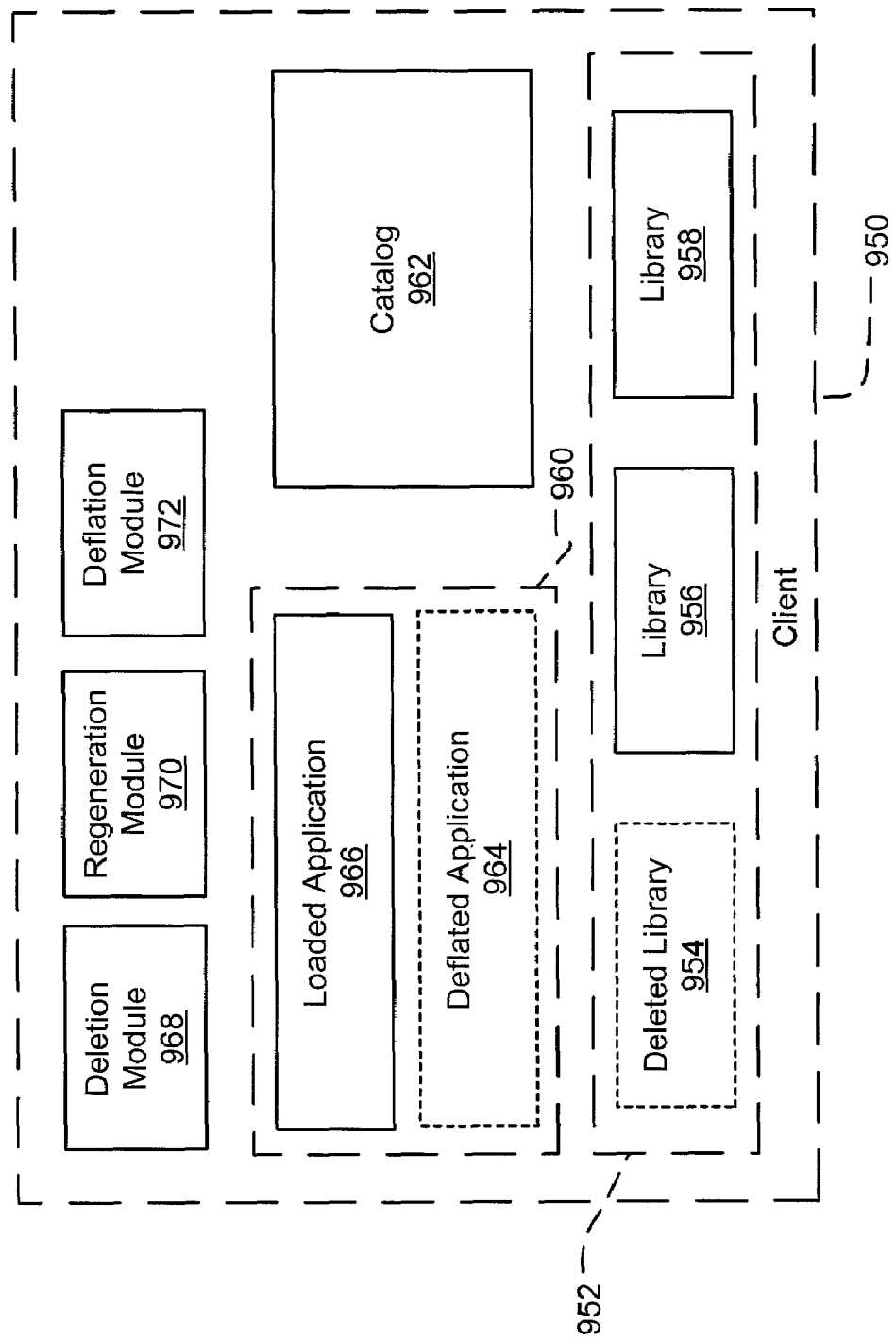
FIG. 9B illustrates modules for deflating, deleting, and regenerating applications, libraries, and types on a client system in an alternative embodiment of the present invention.

FIG. 9B illustrates modules for deflating, deleting and regenerating applications, libraries, and types on a client system in an alternative embodiment of the present invention. In client system 950, a catalog 962 stores information similar to that of catalog 916 in FIG. 9A. FIG. 9B also illustrates a deletion module 968, a regeneration module 970, a deflation module 972, a loaded application 966 in the application storage region 960, and loaded libraries 956 and 958 in the storage library region 952.

In the embodiment illustrated in FIG. 9B, however, the catalog 962, the deflation module 972 and regeneration module 970 differ in operation from those described with regard to FIG. 9A. In FIG. 9B, the catalog 962 also contains the install point for the application. As such, a deflation operation need not maintain a manifest stub for a deflated application 964. Instead, the deflated application 964 may be deleted from the client entirely, as well as any subsequently non-referenced libraries or types loaded on the client (see deleted library 954). In one embodiment, an invalid flag is set within the catalog in association with the deflated application's entry in the catalog. Therefore, if the deflated application 964 is thereafter invoked by the client system, the catalog 962 indicates that the deflated application 964 and associated client-needed libraries are invalid and must be re-generated from the associated install point listed in the catalog 962.

Figure 10A:
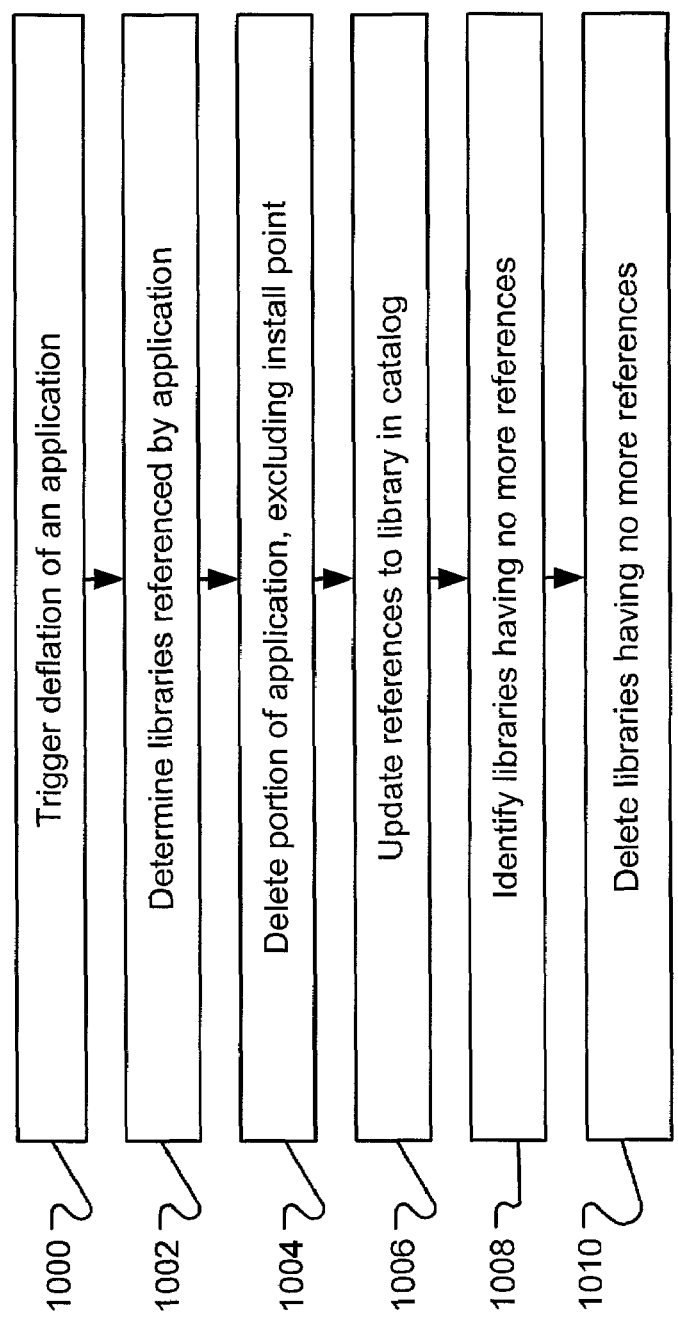
FIG. 10A illustrates operations for deflating an application on a client system in an embodiment of present invention.

FIG. 10A illustrates operations for deflation of an application on a client system in an embodiment of present invention. Triggering operation 1000 invokes the deflation of a specified application in response to a predetermined condition. In one embodiment, the triggering operation 1000 executes in response to a need for additional available resources within the client. For example, a user requests a new application and associated libraries to be installed in the client, but there is not enough storage space to accommodate the new files. As such, the client may automatically examine the LRU tracking information and select a least recently used application for deflation. It should be understood that the predetermined condition may also involve consideration of "undeflatable" application, such as key applications that the user never wants deflated, and other parameters. Even if an undeflatable application is the "least recently used" application, the application will not be deflated and the "next least recently used" application may be targeted for deflation.

Determining operation 1002 determines the one or more libraries or types referenced by the application. The deflation module may analyze the application code itself to determine which libraries and types are referenced by the application that is to be deflated. Alternatively, the deflation module may analyze the dependency information stored in the catalog or some other datastore to determine which libraries or types are referenced by the target application. The dependency information may also include a count or list of other applications that may also reference the various libraries and types.

Deletion operation 1004 deletes a portion of the application, leaving the install point indicator in a manifest stub loaded in the client. The install point indicator remains useful for the regeneration process, as described in FIG. 11. Update operation 1006 updates the dependency information, which may be stored in the catalog, to indicate that an application that was referencing certain libraries and types has been deleted. As such, the reference count for such libraries and types is decremented or the dependency reference (e.g., an identifier of the deleted application) is removed from the dependency information for such libraries. Identification operation 1008 identifies libraries and types having a reference count equaling zero (or having an empty list of referencing application) after the update operation 1006. Deletion operation 1010 deletes the identified libraries and types. It should be understood that dependency information for individual classes and methods may also be maintained so that an individual type may be deleted when all dependencies for the individual type are removed, as opposed to waiting for all references to the entire library to be removed.

Figure 10B:
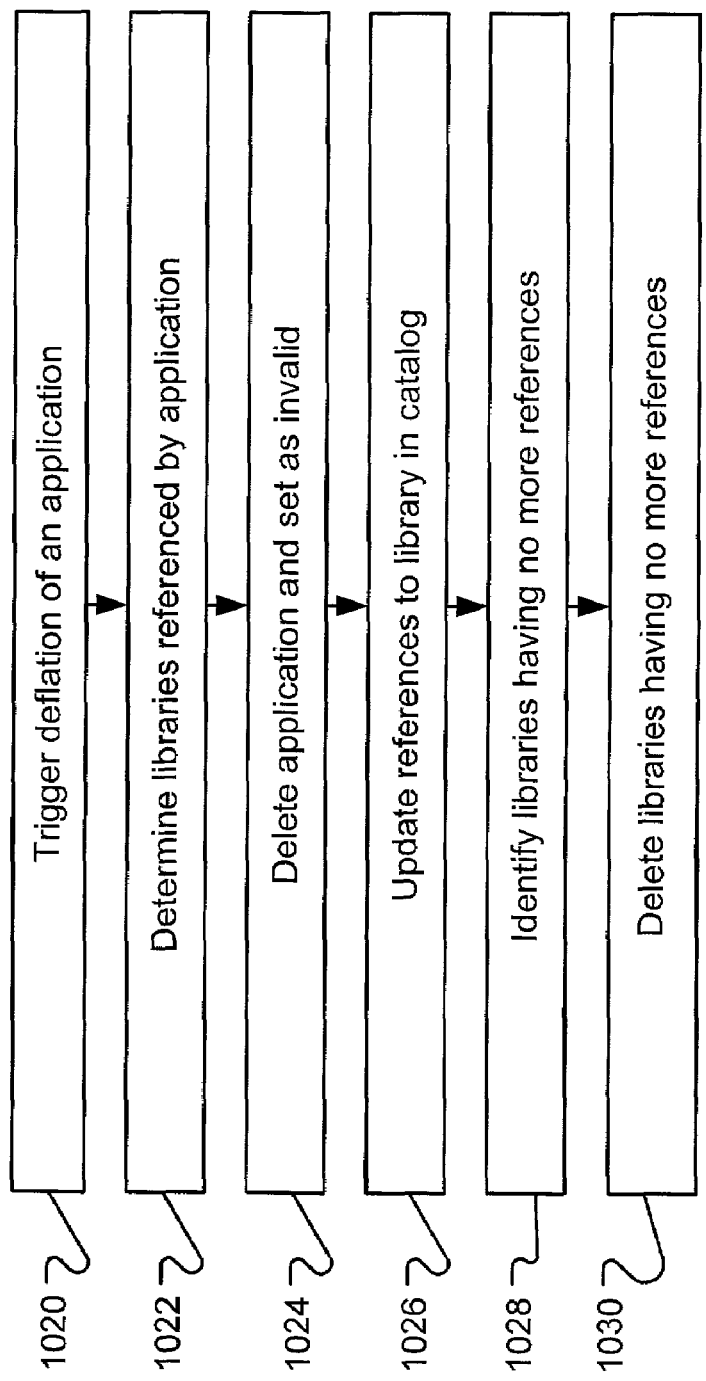
FIG. 10B illustrates operations for deflating an application on a client system in an alternative embodiment of present invention.

FIG. 10B illustrates operations for deflation of an application on a client system in an alternative embodiment of present invention. Operations 1020, 1022, 1026, 1028, and 1020 are similar in operation to the corresponding operations described in FIG. 10A. However, instead of leaving a manifest stub, as described with regard to operation 1004 of FIG. 10A, operation 1024 deletes the entire application and sets an invalid flag in the catalog. A regeneration operation (see FIG. 11B) can use the install point recorded in the catalog to regenerate the application upon invocation.

Figure 11A:
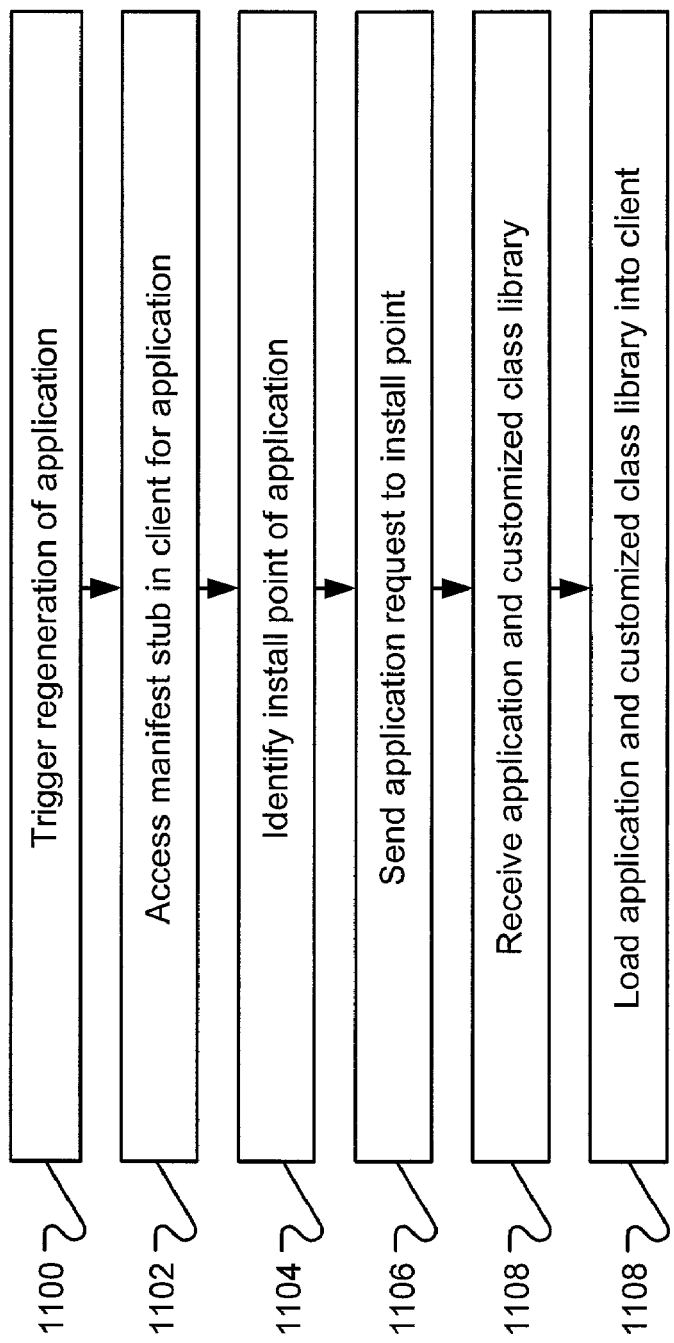
FIG. 11A illustrates operations for regenerating an application on a client system in an embodiment of present invention.

FIG. 11A illustrates operations for regenerating an application on a client system in an embodiment of present invention. After deflation, the install point indicator of a deflated application remains loaded in the manifest stub on the client. The user or another process in the client may therefore attempt to invoke the application as though the application were still loaded on the client. In response to an invocation attempt, triggering operation 1100 triggers regeneration of the application. Access operation 1102 accesses the manifest stub for the target application. The manifest stub includes the install point indicator for the application, which is identified in identification operation 1104. An application request module (see, for example, module 218 in FIG. 2) request the application from the application's install point. Receiving operation 1108 receives the application and associated libraries, such as a customized class library. It should be understood, however, that the received library need not be customized within the scope of the present invention and may include unneeded classes and methods. Loading operation 1108 loads the application and the class library or types into the client, updating the catalog to reflect the new files and dependencies.

FIG. 11B illustrates operations for regenerating an application on a client system in an alternative embodiment of present invention. Operations 1120, 1126, and 1128 are similar in operation to the corresponding operations described in FIG. 11A. However, instead of accessing a manifest stub to determine the appropriate install point for the application, as described with regard to operation 1102 of FIG. 11A, operation 1122 accesses the catalog and operation 1124 determines the install point from the catalog entry. In addition operation 1130 resets the invalid flag to indicate in the catalog that the application is valid again.

It should be understood that a given application may be dependent upon types in multiple libraries (see e.g., type libraries 208). In addition, a customized library may also be allocated in multiple customized sub-libraries within the scope of the present invention.

In an alternative embodiment, versioning policies may be applied in both deflation and customized library generation. When application-referenced types are compared to those available on the client, a versioning policy can be applied to determine whether an already loaded version of the application-referenced type is satisfactory. If so, the type may not be included in the client composite list. If not, the new version of the type may be identified in the client composite list, so that the resulting customized class library will include the new version of the type for loading on the client, supplementing or replacing another version of the type if such a version is already loaded on the client.

Likewise, when identifying deflation candidates, the deflation module may consider, in addition to exemplary LRU or infrequently used algorithms, the versioning policy for a given type. For example, if a new version of a type is received by a client, a versioning module or the deflation module itself may update references for all application and types marked with the "use latest version" versioning parameter. This process may reduce a reference count for a given type to zero and result in automatic deletion.

Individual client devices may be configured with versioning policies, such as "use latest version" or "use exact" version". The "use latest version" policy allows old versions of a given type to be deleted for space savings once a newer version of the type is loaded in the client. In the "use exact version" policy, multiple versions of a given type may be maintained on a client and may be called by individual applications as appropriate. In one embodiment of the present invention, the versioning policies may be mixed and matched for various individual types by maintaining a versioning policy parameter in the catalog in association with each type. In addition, each application may also be associated with versioning parameters so as to identify which versions and which versioning scheme the application supports.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

We claim:

1. A computer program product stored on at least one computer storage medium encoding a computer program for executing on a computer system a computer process for generating, before execution of an application requested by a client, a customized library for execution of the requested application by the client, the client including one or more client-loaded types already loaded on the client, the computer process comprising:

receiving an application request for the application not loaded on the client;

identifying one or more application-referenced types developed by third parties on which the application depends for execution but which are not part of the application;

identifying the one or more client-loaded types;

comparing the one or more application-referenced types to the one or more client-loaded types to identify one or more client-needed types, wherein client-needed types comprise one or more application-referenced types that are not client-loaded types;

receiving a device profile specifying a characteristic of the client;

identifying more than one client-needed type candidate, based on the client-needed types identified in the operation of the identifying the one or more client-needed types;

selecting one of the client-needed type candidates based on the characteristic identified in the device profile to provide one of the client needed types;

generating the customized library, including the one or more client-needed types; and separately sending the customized library and the application to the client for execution.

2. The computer program product of claim 1 wherein the operation of generating a customized library comprises:

inserting only client-needed types into the customized library.

3. The computer program product of claim 1 wherein the operation of identifying one or more application-referenced types comprises:

identifying a version identifier of at least one of an application-referenced type and a client-needed type.

4. The computer program product of claim 1 wherein operation of generating a customized library comprises:

excluding from the customized library one or more non-identified types, each non-identified type not being referenced by the application.

5. The computer program product of claim 1 wherein the operation of identifying one or more application-referenced types comprises:

examining the application to identify one or more type references, each type reference being associated with an application-referenced type; and generating a dependency list identifying the one or more application-referenced types, based on the one or more type references.

6. The computer program product of claim 5 wherein the operation of generating a dependency list comprises:

recursively examining an application-referenced type to identify one or more additional type references referenced by the application-referenced type; and adding the one or more additional type references to the dependency list.

7. The computer program product of claim 1 wherein the operation of comparing the one or more application-referenced types to the one or more client-types to identify one or more client-needed types comprises:

generating a client composite list to identify the one or more client-needed types, the one or more client-needed types including the one or more application-referenced types not loaded on the client.

8. The computer program product of claim 7 wherein the operation of generating a client composite list comprises:
    determining whether a new version of an application-referenced type is needed by the client, based on a versioning policy.

9. The computer program product of claim 7 wherein the operation of identifying one or more client-loaded types comprises:
    accessing a client catalog specifying the one or more client-loaded types loaded on the client; and
    examining the client catalog to identify the one or more client-loaded types.

10. The computer program product of claim 1 wherein the operation of identifying one or more client-needed types comprises:
    identifying the one or more client-loaded types by receiving a list of the client-loaded types from the client; and
    evaluating the client-loaded types against the application-referenced types to identify the client-needed types.

11. The computer program product of claim 1 wherein the operation of identifying one or more client-needed types comprises:
    receiving a client composite list specifying the one or more application-referenced types not loaded on the client.

12. The computer program product of claim 1 wherein the operation of generating a customized library comprises:
    creating a new library containing no types; and
    adding each of the one or more client-needed types to the new library to provide the customized library.

13. The computer program product of claim 12 wherein the adding operation comprises:
    adding one or more global data fields of each client-needed type to the new library.

14. The computer program product of claim 12 wherein the adding operation comprises:
    adding a method signature corresponding to a method of each client-needed type to the new library; and
    adding a code body associated with the method of each client-needed type to the new library.

15. The computer program product of claim 14 wherein the operation of adding a method signature comprises:
    adding to the new library metadata describing the method.

16. The computer program product of claim 1 wherein an application-referenced type includes a class.

17. The computer program product of claim 1 wherein an application-referenced type includes at least one of a method, a class, a data field, or a resource.

18. The computer program product of claim 1 wherein a client-loaded type includes at least one of a method, a class, a data field, or a resource.

19. The computer program product of claim 1 wherein the computer process further comprises:
    receiving a device profile specifying a characteristic of the client; and
    excluding an attribute from the customized library, if the attribute is incompatible with the characteristic of the client.

20. A customized library management system executing on a processor for managing a customized class library, the system comprising:
    an application server module receiving an application request and transmitting a requested application to a client;
    a receiver module receiving a device profile specifying a characteristic of the client;
    an identification module identifying more than one client-needed type candidate,
    a selection module wherein the selection module selects one of the client-needed type candidates based on the characteristics identified in a device profile to provide one of a client needed type; and
    a customized library generator identifying application-referenced types, the customized library generator also creating a customized library before execution of the requested application by the client and separately sending the customized library to the client, the customized library including one or more client-needed types, which are application-referenced types developed by third parties not loaded on the client but required by the application to execute.

21. A customized library management system executing on a processor for separately receiving a customized library associated with an application, the system comprising:
    a catalog identifying one or more client-loaded types that are loaded on a client;
    a filter module comparing the catalog to a list of one more application-referenced types, which are developed by third parties and required by the application to execute, and generating a client composite list to identify one or more client-needed types, the client-needed types comprising one or more of the application-referenced-types that are not client-loaded types;
    a receiver module receiving a device profile specifying a characteristic of the client;
    an identification module identifying more than one client-needed type candidate, based on the client needed types identified in the operation of identifying the one or more client-needed types;
    a selection module wherein the selection module selects one of the client-needed type candidates based on the characteristics identified in a device profile to provide one of a client needed type; and
    a customized library generator loading the client-needed types from the client composite list into the customized library before execution of the application by the client; and
    a client receipt module for separately receiving the customized library and the application.

22. The customized library management system of claim 21 further comprising:
    a client request module requesting the application from a server.

23. The customized library management system of claim 21 wherein the catalog comprises:
    an application identifier associated with the application loaded on the client.

24. The customized library management system of claim 21 wherein the catalog further comprises:
    dependency information identifying a client-loaded type referenced by the application.

25. The customized library management system of claim 21 wherein the catalog further comprises:
    an install point indicator associated with the application.

26. The customized library management system of claim 21 wherein the catalog comprises:
    a type identifier associated with a client-loaded type; and
    dependency information associated with the type identifier and identifying one or more client-loaded applications referencing the client-loaded type.

27. The customized library management system of claim 21 wherein the catalog comprises:

dependency information recording a reference count of one or more applications referencing the client-loaded type.

28. A computer program product stored on at least one computer storage medium encoding a computer program for executing on a server computer system a computer process for generating, before execution of an application requested by a client, a customized library for execution of the requested application by the client, the client including one or more client-loaded types already loaded on the client, the computer process comprising:
- receiving an application request for the application not loaded on the client;
- identifying one or more application-referenced types developed by third parties on which the application depends for execution but which are not part of the application;
- sending a list of the one or more application-referenced types;
- receiving a client composite list of the client-needed types, wherein client-needed types comprise one or more application-referenced types that are not client-loaded types;
- receiving a device profile specifying a characteristic of the client;
- identifying more than one client-needed type candidate, based on the client-needed types identified in the operation of the identifying the one or more client-needed types;
- selecting one of the client-needed type candidates based on the characteristic identified in the device profile to provide one of the client needed types;
- generating the customized library, including the one or more client-needed types from the client composite list; and
- separately sending the customized library and the application to the client for execution.

29. A computer program product stored on at least one computer storage medium encoding a computer program for executing on a client computer system a computer process for receiving, before execution of an application requested by a client, a customized library for execution of the requested application by the client, the client including one or more client-loaded types already loaded on the client, the computer process comprising:
- sending an application request for the application not loaded on the client;
- receiving a list of application-referenced types for the application;
- comparing the list of application-referenced types to a catalog of the one or more client-loaded types;
- determining one or more client-needed types, wherein the one or more client-needed types are application-referenced types that are not client-loaded types;
- creating a client composite list including the one or more client-needed types;
- sending the client composite list;
- receiving a device profile specifying a characteristic of the client;
- identifying more than one client-needed type candidate, based on the client-needed types determined in the operation of the determining the one or more client-needed types;
- selecting one of the client-needed type candidates based on the characteristic identified in the device profile to provide one of the client needed types;
- receiving the customized library, including the one or more client-needed types in the client composite list;
- separately receiving the application; and
- executing the application.

* * * * *